Reissued Jan. 15, 1935 Re. 19,426

UNITED STATES PATENT OFFICE 19,426

COAGULATION OF LATEX

Stephen B. Neiley, Winchester, Mass., assignor to Dewey and Almy Chemical Company, Cambridge, Mass., a corporation of Massachusetts No Drawing. Original No. 1,896,054, dated January 31, 1933, Serial No. 562,824, September 14, 1931. Application for reissue January 15, 1934, Serial No. 706,790

11 Claims. (Cl. 18—50)

This invention relates to the coagulation of rubber latex, and has for its objects the production of normally stable uncoagulated and unthickened compositions of latex, susceptible to coagulation under definitely controllable conditions, and to the process by which coagulation of rubber latex may thereby be determined and controlled.

Various attempts in these directions have been made; these, however, so far as I am informed, have involved the association by solution or dispersion in rubber latex of substances only feebly coagulative at ordinary room temperatures, but nevertheless coagulative in some degree, which progressively become more effective as the temperature is raised. Such substances have been called "dormant" coagulants.

The present invention is qualitatively and sharply differentiated from early expedients employing dormant coagulants in that I employ, in solution or dispersion in latex, substances which at normal atmospheric temperatures (the range including hot weather temperatures) manifest no thickening or coagulative effect at all, but which, by dissociation of composition, generate or release a vigorously coagulative substance at a closely determinable high temperature, below the boiling point of water. Research which developed this invention revealed the fact that certain complex zinc ions which dissociate at temperatures higher than normal atmospheric temperatures but below the boiling point of water to release or generate free zinc cations manifest no thickening or coagulative effect in a rubber latex in which they are in solution until the temperature of the composition is raised above a critical value at which temperature free zinc cations are released and forthwith effect coagulation of the latex rubber.

It is well known that if strong aqueous ammonia is slowly stirred into a solution of a soluble zinc salt, there is formed a flocculent white precipitate which, on continued addition of ammonia, dissolves to give a substantially clear solution in which the zinc is present as a complex zinc ion, commonly assumed to have the structure $Zn(NH_3)_4$. Depending upon the prevailing conditions of dilution, for every mol. of zinc present four or more mols of ammonia are required to dissolve the flocculent white precipitate. I have discovered that solutions containing such complex zinc ions are substantially without effect on colloidally dispersed rubber at ordinary temperatures but that when the temperature of the mixture is raised above a critical value, they effect thorough coagulation.

My new composition, unlike dormant coagulants formerly employed, owes its efficacy, I believe, to a heat-induced chemical change which releases in the aqueous medium of the latex a new chemical entity strongly coagulative of the colloidally dispersed rubber. The zinc, as previously stated, I assume to be present as a component of a complex ion which is substantially without effect on latex. At ordinary temperatures it remains as such unchanged; but at an elevated temperature it undergoes dissociation with formation of ammonia and zinc cation, which is strongly coagulative of latex and produces the desired coagulation.

Zinc complex ions, which fall within the category above generally characterized, may be conveniently derived in the manner indicated above and, as illustrated by the examples below, from any soluble zinc salts such as zinc chloride, sulfate, nitrate, acetate, formate, benzoate, etc. Similarly effective complex zinc ions can be obtained by the preparatory use, as equivalent substitutes for ammonia, of methyl amine, ethyl amine, hydroxylamine, or any other organic amine which, like ammonia, is capable of forming a heat-dissociable complex zinc ion. It will thus be observed that the equivalency of a zinc complex ion for—say—a zinc complex derived from zinc chloride and ammonia in the performance of controlled coagulation of latex is readily determinable by the heat-dissociation test described below.

Whatever may be the specific composition of the heat-dissociable zinc complex ion employed with latex to produce a composition normally stable but productive of a latex coagulant at an abnormal temperature, critical within close ranges, the said critical temperature at which the released coagulant is effective will vary with variations in the inherent stability of the latex itself (which may be ascertained by well known mechanical tests), with the proportions of the reagents used to produce the soluble complex, and with the quantitative ratio between the complex and the latex rubber. By manipulation in accordance with these variants the coagulation of a rubber latex can be very accurately controlled.

By the term "rubber latex," as employed in this specification, is meant any artificial dispersion of rubber as well as any natural latex or any natural latex preserved with ammonia, formaldehyde, or the like, e. g. ammonia-preserved Hevea latex, with or without compounding, filling, and/or supplementary protective agents.

As to detailed modes of operation, the following examples are given:

*Example I*

Ten parts of granulated zinc chloride are dissolved in 160 parts of water. To this solution are slowly added with stirring 15 parts of 28° Bé. commercial ammonia water. The resulting solution should be only faintly turbid and should react strongly alkaline to phenolphthalein.

When 42 parts of the solution prepared as above are added to 300 parts of ordinary ammonia-preserved commercial latex, which contains about 35% of rubber and 0.8% of ammonia and which has a mechanical stability of about 8 minutes when determined by rapid stirring according to the usual standardized latex stability test, there is obtained a composition which is stable at ordinary temperatures but which will readily coagulate at temperatures above 140–145° F. If the quantity of zinc complex employed in the foregoing procedure is reduced to 35 parts, there is obtained a composition which manifests no activity at temperatures below 160° F., but coagulates readily thereabove. Similarly, if the quantity of zinc complex is increased to 50 parts, there results a composition which has a minimum coagulation temperature (activation temperature) of about 125° F.

The temperature below which there occurs no coagulation of the rubber of such a latex composition and above which ready coagulation takes place I call the activation temperature. The activation temperature of a composition of this character may be determined by heating a quantity of the same in a beaker in a bath of boiling water while the contents of the beaker are slowly stirred with a thermometer. The temperature at which the mass coagulates is taken as the activation temperature. Noticeable thickening below the activation temperature is an indication of deficiency in ammonia, and a larger proportion should be employed.

*Example II*

Ten parts of crystalline zinc acetate ($Zn(C_2H_3O_2)_2 3H_2O$) are dissolved in 160 parts of water. To this solution are added with stirring 9 parts of 28° Bé. commercial ammonia water. If 34 parts of the resulting solution of zinc complex are added to 265 parts of latex of characteristics stated above, the resulting composition will be very stable at ordinary temperatures but will coagulate readily when the temperature is raised above 176–178° F., the activation temperature of the compound.

If the quantity of zinc complex solution employed in the previous example is increased to 50 parts, the activation temperature of the latex compound will be lowered to 162–164° F.; or if it is increased to 63 parts, the activation temperature will be lowered to 150–152° F.

*Example III*

Twenty parts of finely divided zinc oxide such as the so-called "colloidal zinc oxide" ("Kadox") are mixed with 50 parts of ammonium benzoate and the resulting mixture is stirred into 140 parts of 28° Bé. commercial ammonia water. Stirring is continued until a substantially clear solution results. In this manner there is obtained sufficient zinc complex solution for use with about 1800 parts of ordinary 35% commercial latex of the above stated characteristics. When used in these proportions the composition has an activation temperature of about 172° F.

By way of caution, it should be observed that complexes involving zinc salts of the stronger acids, particularly the sulfate or nitrate, contain, upon dissociation in the solution, inorganic anions which are likely to be detrimental to the rubber coagula and, if organic fibers are associated with the solution of the complex in latex, to the fibers especially. Complexes derived from zinc salts of strong acids should therefore be employed with caution, and avoided, as practically they may be in most, if not all, cases.

In my opinion, the most benign of the zinc complexes given hereinabove in the examples of procedure is that produced by reaction of ammonium benzoate upon colloidal zinc oxide. The benzoate ion afforded by the ammonium benzoate has the further advantage of being a preservative of the rubber against bacterial growth.

While the use of protectives in association with the above outlined coagulant-generating compositions is not necessarily precluded, their employment will, I believe, be incidental to special conditions and objects, and will not, other than by specific modification, involve departure from the essence of this invention, which is best exemplified by the nature and behavior of compositions in which no protective is employed. In this connection it should be observed that the term "protective" is here used as exclusive of such substances as ammonia, which are, properly speaking, preservatives rather than protectives.

I am aware that zinc oxide has been employed for thickening and coagulating ammoniacal latex. Under the conditions of use, however, no zinc complex with ammonia could have been formed and the procedure neither fulfills the objects of the present invention nor comes within its purview. In order to form a complex from ammonia and zinc oxide such as, or comparable to, that employed as a controllable source of a coagulant in the present invention, it is essential that the zinc oxide be contacted with the ammonia in high concentration. Low concentrations of ammonia, such as prevail in ordinary ammoniacal latex, are inadequate to bring about the desired reaction with zinc oxide. Under such conditions zinc oxide remains suspended as such in the aqueous medium of the latex and the ammonia plays no part in conjunction with it unless to oppose or suppress the well known coagulative influence of zinc oxide on ammoniacal latex; i. e., under these circumstances the zinc oxide is a strict equivalent of other difficultly soluble materials coagulative of latex such as calcium sulfate, aluminum hydroxide, diphenyl guanidine, etc., which have been used as dormant coagulants for latex.

While I generally prefer to use ammonia for the production of zinc complexes because it is cheaper and has a less objectionable odor than other amines, it is sometimes desirable to employ one of the suitable organic amines because of their well known beneficial influence on rubber.

It should be understood that the present disclosure is for the purpose of illustration only, and that this invention includes all modifications and equivalents which fall within the scope of the appended claims.

I claim:

1. Normally stable heat coagulable composition comprising rubber latex and heat-activable complex zinc ion.

2. Normally stable heat coagulable composition comprising rubber latex and heat-activable complex ammonium zinc ion.

3. Normally stable heat coagulable composition comprising rubber latex and heat-activable complex amino zinc ion.

4. Normally stable heat coagulable composition comprising rubber latex and heat-activable complex ammonium zinc ion, substantially free from anions of strong mineral acids.

5. Normally stable heat coagulable composition comprising rubber latex and heat-activable complex zinc ion, substantially free from anions of strong mineral acids.

6. Method of controllably coagulating rubber latex, which comprises adding to the latex complex zinc ion at a temperature below the activating temperature thereof, to form a composition stable at such temperature, and thereafter raising the temperature of the composition to a point whereat the rubber coagulates.

7. Method of controllably coagulating rubber latex, which comprises adding to the latex complex ammonium zinc ion at a temperature below the activating temperature thereof, to form a composition stable at such temperature, and thereafter raising the temperature of the composition to a point whereat the rubber coagulates.

8. Method of controllably coagulating rubber latex, which comprises adding to the latex complex amino zinc ion below the activating temperature thereof, to form a composition stable at such temperature and thereafter raising the temperature of the composition to a point whereat the rubber coagulates.

9. Method of controllably coagulating rubber latex, which comprises adding to the latex complex zinc ion substantially free from the anions of strong mineral acids to form a composition stable at such temperature and thereafter raising the temperature of the composition to a point whereat the rubber coagulates.

10. Method of controllably coagulating rubber latex, which comprises adding to the latex complex ammonium zinc ion substantially free from the anions of strong mineral acids at a temperature below the activating temperature thereof, to form a composition stable at such temperature, and thereafter raising the temperature of the composition to a point whereat the rubber coagulates.

11. Normally stable heat coagulable composition, comprising rubber latex, heat-activable complex zinc ion, and benzoate ion.

STEPHEN B. NEILEY.